US012812521B2

(12) United States Patent
Ichihara et al.

(10) Patent No.: US 12,812,521 B2
(45) Date of Patent: Nov. 24, 2026

(54) CONTROL OF CLOSED NETWORK USING NETWORK SLICE

(71) Applicant: RAKUTEN MOBILE, INC., Tokyo (JP)

(72) Inventors: Atsushi Ichihara, Tokyo (JP); Masahiko Nanri, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 295 days.

(21) Appl. No.: 18/259,778

(22) PCT Filed: Dec. 27, 2022

(86) PCT No.: PCT/JP2022/048303
§ 371 (c)(1),
(2) Date: Jun. 29, 2023

(87) PCT Pub. No.: WO2024/142288
PCT Pub. Date: Jul. 4, 2024

(65) Prior Publication Data
US 2024/0406852 A1 Dec. 5, 2024

(51) Int. Cl.
*H04W 48/18* (2009.01)
*H04W 12/06* (2021.01)
*H04W 88/04* (2009.01)

(52) U.S. Cl.
CPC .......... *H04W 48/18* (2013.01); *H04W 12/06* (2013.01); *H04W 88/04* (2013.01)

(58) Field of Classification Search
None
See application file for complete search history.

(56) References Cited

U.S. PATENT DOCUMENTS 10,136,323 B2 * 11/2018 Stocker ................ H04L 63/126
10,834,776 B2 * 11/2020 Dowlatkhah ......... H04W 76/18
11,051,172 B2 * 6/2021 Avula .................. H04W 76/14
(Continued)

FOREIGN PATENT DOCUMENTS

JP 2017-143363 A 8/2017
JP 2020-150387 A 9/2020
(Continued)

*Primary Examiner* — Jason D Cardone
(74) *Attorney, Agent, or Firm* — HAUPTMAN HAM, LLP

(57) ABSTRACT

To facilitate external access to a certain network while maintaining a high security level, a communication system authorizes, based on a permission request relating to a terminal connectable to a network slice of a closed network, the network slice of the closed network as a network slice to which connection via a specified radio device which is a part of a plurality of base station radio devices is permitted (S103 and S104). After the network slice of the closed network is added, the communication system sets a communication path between the terminal connected to the network slice of the closed network via the specified radio device and a service system connected to the network slice of the closed network (S204). After communication via the specified radio device is finished, the communication system cancels the authorization of the network slice of the closed network as the network slice to which connection via the specified radio device is permitted (S303 and S304).

15 Claims, 10 Drawing Sheets

(56) References Cited

U.S. PATENT DOCUMENTS

| | | | | |
|---|---|---|---|---|
| 11,855,856 | B1 * | 12/2023 | Guduru | H04L 41/14 |
| 11,963,247 | B2 * | 4/2024 | Faccin | H04W 76/18 |
| 12,317,105 | B2 * | 5/2025 | Sant | G06F 8/77 |
| 12,464,417 | B2 * | 11/2025 | Zhou | H04W 36/0094 |
| 12,574,302 | B2 * | 3/2026 | Ichihara | H04L 41/40 |
| 2018/0316690 | A1 * | 11/2018 | Cho | H04W 12/106 |
| 2021/0092725 | A1 | 3/2021 | Park et al. | |
| 2022/0070157 | A1 * | 3/2022 | Ben Henda | H04L 63/20 |
| 2022/0086821 | A1 | 3/2022 | Park et al. | |
| 2022/0263826 | A1 * | 8/2022 | Ping | H04L 63/083 |
| 2023/0026697 | A1 * | 1/2023 | Li | H04W 48/08 |
| 2023/0109272 | A1 * | 4/2023 | Ryu | H04L 63/0892 370/329 |
| 2023/0319757 | A1 * | 10/2023 | Kim | H04W 36/0022 370/329 |
| 2024/0365220 | A1 * | 10/2024 | Bulakci | H04W 48/18 |
| 2025/0056665 | A1 * | 2/2025 | Ianev | H04W 76/18 |
| 2025/0081038 | A1 * | 3/2025 | Bashir | H04W 28/0942 |
| 2025/0097732 | A1 * | 3/2025 | Hegde | H04W 24/02 |
| 2025/0133462 | A1 * | 4/2025 | Liu | H04W 36/13 |
| 2025/0184261 | A1 * | 6/2025 | Tamura | H04W 48/18 |
| 2026/0150070 | A1 * | 5/2026 | Tsuda | H04W 60/002 |

FOREIGN PATENT DOCUMENTS

| | | | |
|---|---|---|---|
| JP | 2022521821 | A | 4/2022 |
| WO | 2022/008179 | A2 | 1/2022 |

* cited by examiner

FIG.5

| NETWORK SLICE IDENTIFICATION INFORMATION | AMF IDENTIFICATION INFORMATION |
|---|---|
| DefaultSlice | CoreAMF_d |
| ClosedHospitalSlice | CoreAMF_h |

CONTROL OF CLOSED NETWORK USING NETWORK SLICE

RELATED APPLICATIONS

The present application is a National Phase of International Application Number PCT/JP2022/048303, filed Dec. 27, 2022.

TECHNICAL FIELD

The present disclosure relates to control of a closed network using a network slice.

BACKGROUND ART

In an organization which requires high security, security is ensured by arranging confidential information and the like within an internal network and preventing intrusion into the internal network from the outside. When a person belonging to the organization wishes to access the internal network from the outside, a technology such as a virtual private network (VPN) may be used to permit his or her terminal to access the internal network.

In JP 2022-521821 A, it is disclosed that there are wireless devices that are permitted to access a closed access group, and that one or more cells are associated with the closed access group. In JP 2022-521821 A, it is also described that at least one of a non-public network, a network slice, or a public land mobile network is associated with the closed access group.

SUMMARY OF INVENTION

Technical Problem

Using a technology such as a VPN requires a user operation at the time of access, which is time consuming for the user, and there is a concern that sufficient security cannot be ensured due to an operation error, for example.

The present disclosure has been made in view of the above-mentioned circumstances, and has an object to provide a technology capable of facilitating external access to a certain network while maintaining a high security level.

Solution to Problem

In order to solve the above-mentioned issues, according to one embodiment of the present disclosure, there is provided a communication system including one or more processors and a plurality of base station radio devices including a specified radio device. The communication system causes at least one of the one or more processors to execute an authorization process, a path setting process, and a cancellation process. In the authorization process, based on a permission request relating to a terminal connectable to a predetermined network slice forming a closed network, the predetermined network slice is authorized as a network slice to which connection via the specified radio device is permitted. In the path setting process, after the predetermined network slice is added, a communication path is set between the terminal connecting to the predetermined network slice via the specified radio device and a service system connected to the predetermined network slice. In the cancellation process, after communication between the terminal and the service system via the specified radio device is finished, the authorization of the predetermined network slice as the network slice to which connection via the specified radio device is permitted is canceled.

Further, according to one embodiment of the present disclosure, there is provided a communication control method including causing at least one of one or more processors to: authorize, based on a permission request relating to a terminal connectable to a predetermined network slice forming a closed network, the predetermined network slice as a network slice to which connection via a specified radio device which is a part of a plurality of base station radio devices is permitted; set, after the predetermined network slice is authorized, a communication path between the terminal connecting to the predetermined network slice via the specified radio device and a service system connected to the predetermined network slice; and cancel, after communication between the terminal and the service system via the specified radio device is finished, the authorization of the predetermined network slice as the network slice to which connection via the specified radio device is permitted.

BRIEF DESCRIPTION OF DRAWINGS

FIG. 5 is a table for showing an example of a list of connectable network slices.

DESCRIPTION OF EMBODIMENTS

An embodiment of the present disclosure is now described in detail with reference to the drawings.

Figure 1:
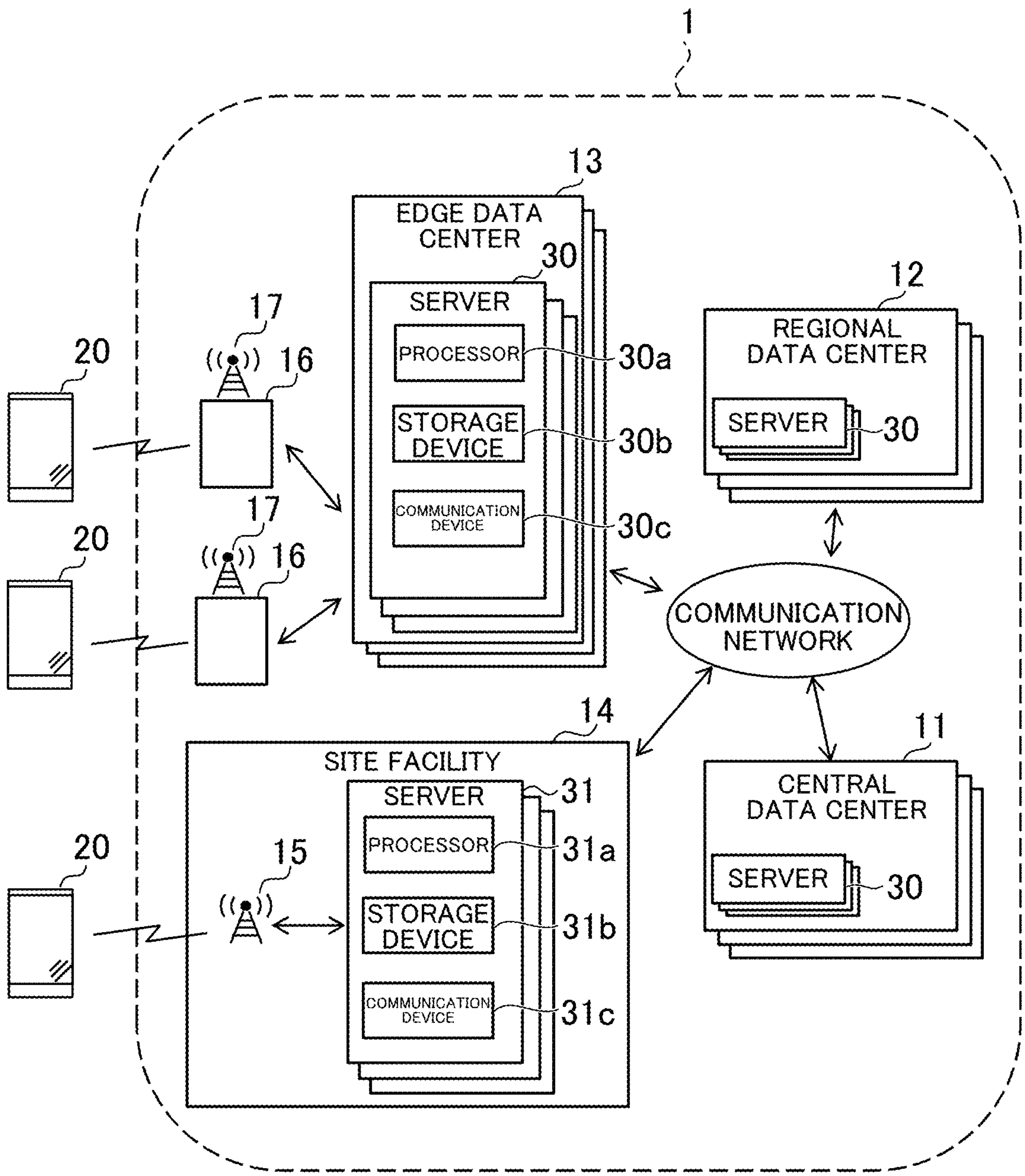
FIG. 1 is a diagram for illustrating an example of a communication system in an embodiment of the present disclosure.
Figure 2:
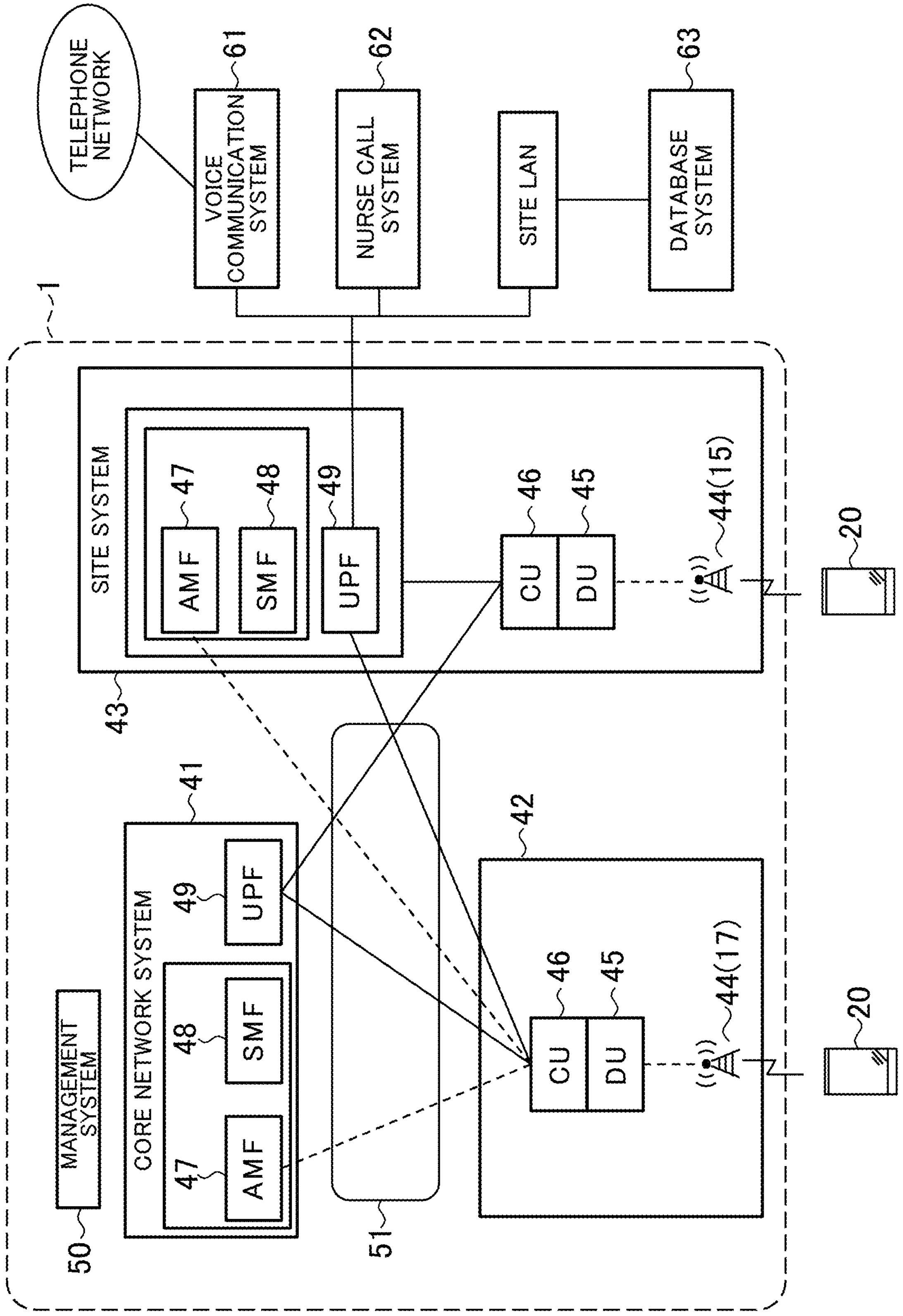
FIG. 2 is a diagram for schematically illustrating the communication system in the embodiment.

FIG. 1 and FIG. 2 are each a diagram for illustrating an example of a communication system 1 in the embodiment of the present disclosure. FIG. 1 is an illustration drawn with attention being given to locations of facilities included in the communication system 1. The communication system 1 provides a mobile communication network. A specific network slice of the provided mobile communication network provides a closed network which connects to a system arranged at a site. As used herein, a simple description "closed network" means the closed network provided by the specific network slice.

As illustrated in FIG. 1, the communication system 1 includes, as facilities, central data centers 11, regional data centers 12, edge data centers 13, a site facility 14, and base station facilities 16. Each base station facility 16 is a facility for wireless mobile communication to and from a terminal 20. Each base station facility 16 includes an antenna 17 and a radio unit (RU), which is described later. Each site facility 14 includes an antenna 15, an RU (not shown), and a plurality of servers 31. The site facility 14 corresponds to a site such as a hospital facility or an office building, for example.

The terminals 20 are referred to as "user equipment (UE)." Each terminal 20 is a mobile terminal such as a smart phone, and can be connected to a mobile communication network by wireless communication. Some of the terminals 20 are configured such that the terminals access the network slice of the closed network, while the other terminals are not.

The central data centers 11, the regional data centers 12, and the edge data centers 13 are collectively referred to as data center group. For example, there are several central data centers 11, several tens of regional data centers 12, and several thousand to several tens of thousands of edge data centers 13. For example, the central data centers 11 are dispersedly arranged in an area (for example, in Japan) covered by the communication system 1. The regional data centers 12 are dispersedly arranged in the area covered by the communication system 1. For example, when the area covered by the communication system 1 is the entire area of Japan, one or two regional data centers 12 may be arranged in each prefecture.

Each of the edge data centers 13 can communicate to and from the base station facility 16. One edge data center 13 may be capable of communicating to and from a plurality of the base station facilities 16.

In this embodiment, for example, the central data centers 11, the regional data centers 12, and the edge data centers 13 can communicate to and from each other via a communication network. Further, the central data centers 11, the regional data centers 12, and the edge data centers 13 can communicate among themselves via a communication network.

A plurality of servers 30 are arranged in each of the central data centers 11, the regional data centers 12, and the edge data centers 13 in this embodiment.

Each of the plurality of servers 30 includes one or more processors 30*a*, a storage device 30*b*, and a communication device 30*c*. The plurality of servers 30 arranged in the central data centers 11, the regional data centers 12, and the edge data centers 13 provide a kind of cloud platform by a virtualized application execution environment, which is described later.

Further, each of the plurality of servers 31 arranged at the site facility 14 includes one or a plurality of processors 31*a*, a storage device 31*b*, and a communication device 31*c*. A virtualized application execution environment is implemented in the plurality of servers 31.

The processors 30*a* and 31*a* are each a program control device such as a microprocessor which operates in accordance with a program. The storage device 30*b* is, for example, a storage element, such as a ROM or RAM, a solid state drive (SSD), a hard disk drive (HDD), or the like. The storage devices 30*b* and 31*b* each store a program to be executed by the processor 30*a* or 31*a*, and the like. The communication devices 30*c* and 31*c* are each, for example, a communication interface, such as a network interface controller (NIC) or a wireless local area network (LAN) module. The communication devices 30*c* and 31*c* each exchange data with other servers or network devices. The communication devices 30*c* and 31*c* may each form a part of software-defined networking (SDN).

In this embodiment, a container-type virtualized application execution environment such as Docker (trademark) is installed in the servers 30 arranged in the central data center 11, the regional data center 12, and the edge data center 13. The container-type virtualized application execution environment, can deploy containers in those servers 30 and can operate those. In those servers 30, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

A container-type virtualized application execution environment and a container management tool may also be installed on the servers 31 arranged at the site facility 14. A cluster formed of one or more containers generated by such a virtualization technology may be constructed in those servers 31.

FIG. 2 is a diagram for schematically illustrating the communication system 1 in this embodiment. FIG. 2 is a diagram for illustrating internal functions and processes of the communication system 1 in particular.

The communication system 1 includes, in terms of function and processes, a core network system 41, a plurality of base station systems 42, a site system 43, and a management system 50. The core network system 41, the base station systems 42, and the site system 43 are connected by a software-defined network (SDN) 51 so that the systems can communicate to and from each other.

Each base station system 42 includes a central unit (CU) 46 and one or more distributed units (DUs) 45. The core network system 41 includes a plurality of access and mobility management functions (AMFs) 47, a plurality of session management functions (SMFs) 48, a plurality of user plane functions (UPFs) 49, and unified data management (UDM) (not shown). Each base station system 42 includes one or more antennas 17 and one or more radio units (RUs) 44. The RUs 44 are radio devices which are connected to the antennas 17 and communicate to and from the terminals 20. The RUs 44 are mainly arranged at the base station facilities 16, and communicate to and from the DU 45 of the same base station system 42.

The site system 43 includes an RU 44, a DU 45, a CU 46, an AMF 47, an SMF 48, and a UPF 49. The site system 43 includes one or more antennas 15 and one or more RUs 44 arranged at the site. The RUs 44 are radio devices which are connected to the antennas 15 and communicate to and from the terminals 20. The RUs 44 communicate to and from the DU 45 of the same site system 43.

The management system 50 controls the functions or processes arranged in the core network system 41, the base station systems 42, and the site system 43. The management system 50 changes, in response to a request, the settings of the network slices that can be received by the RUs 44 of the base station systems 42 corresponding to the request. More specifically, the management system 50 uses at least one of the one or more processors 30*a* to execute an authentication process, a terminal position detection process, an authorization process, and a cancellation process. The management system 50 also includes a container management tool for managing the servers 30 arranged in the data center.

In the authorization process, the management system 50 authorizes, based on the permission request, the network slice of the closed network as a permitted network slice for the RUs 44 of a specified base station system 42. The permitted network slice is a network slice to which connections via the RUs 44 of the base station system 42 are permitted. Further, in the authorization process, the network slice of the closed network may be authorized by adding the network slice of the closed network to the list indicating permitted network slices. The RUs 44 of the specified base station system 42 may all be RUs 44 belonging to a certain base station system 42. In this case, the base station system 42 may simply be specified as the RUs 44. The specified RUs 44 may be one or more RUs 44 which are a part of the RUs 44 belonging to the certain base station system 42.

The permission request may be acquired from a user of the another system connected to the closed network. The another system includes, for example, at least one of a voice communication system 61, a nurse call system 62, or a database system 63. In the cancellation process, after communication by the terminal 20 via the specified RUs 44 is complete, the management system 50 cancels the authorization of the network slice of the closed network as the permitted network slice for the RUs 44. Details of the authentication process and the terminal position detection process are described later.

The functions and the processes of the core network system 41, the management system 50, and the base station systems 42 may be implemented by one or more processors 30*a* included in the one or more servers 30 executing programs (execution commands) stored in the storage device 30*b*. A so-called container management tool may manage the storage of the programs (program modules) corresponding to respective modules in the storage device 30*b* and the execution by the processor(s) 30*a*.

Further, the functions and the processes of the site systems 43 may be implemented by one or more processors 31*a* included in the one or more servers 31 executing programs (execution commands) stored in the storage device 31*b*. A so-called container management tool may manage the storage of the programs (program modules) corresponding to respective modules in the storage device 31*b* and the execution by the processor(s) 31*a*.

The DUs 45 and the CUS 46 included in the base station systems 42 and the site systems 43 are each 5G DUs and CUs. The DUs 45 process uplink signals acquired from the terminals 20 via the RUs 44. The DUs 45 acquire the uplink signals from the terminals 20 via the RUs 44. The DUs 45 also convert downlink data destined for the terminals 20 to downlink signals for wireless transmission. The downlink signals are wirelessly transmitted from the RUs 44.

The DUs 45 may include, for example, the functions of a PHY-High layer, a MAC layer, and an RLC layer in so-called 4G and 5G. Further, the functions of the CUS 46 may include the functions of a PDCP layer and a PRC/SDAP layer. The boundaries of the function layers between the DUs 45 and the CUS 46 may differ from the example described above. The MAC layer performs wireless resource allocation, for example, and the RLC layer performs retransmission control, for example.

As used herein, an uplink signal is the signal input from the terminal 20 side to the DU 45, and a downlink signal is the signal that is output from the DU 45 toward the terminal 20. Data output from the DU 45 to the core network system 41 (for example, AMF 47 or UPF 49) is uplink data, and data output from core network system 41 to the DU 45 is downlink data.

The DUs 45 and the CUS 46 included in the base station systems 42 are mainly arranged in the edge data centers 13. More specifically, those DUs 45 and CUs 46 may be implemented by one or more servers 30 arranged at the edge data centers 13. A given edge data center 13 may include a plurality of sets each including one or more DUs 45 and one CU 46, and the plurality of DUs 45 included in the set may be connected to the CU 46 of the set. The DUs 45 and the CUs 46 included in the base station systems 42 may be arranged in a data center different from the edge data center 13.

The DUs 45 and the CUS 46 included in the site systems 43 may be implemented by one or more servers 31 arranged at the site facilities 14.

The DUs 45 and the CUS 46 included in the base station systems 42 and the site systems 43 may be virtual distributed units (vDUs) and virtual central units (vCUs) in 4G, respectively. A part of the DUs 45 and the CUS 46 may be implemented in the central data centers 11 or the regional data centers 12 instead of the edge data centers 13. The RUs 44, the DUs 45, and the CUS 46 form a radio access network (RAN).

The RAN is a computer system which is provided with the antenna, and corresponds to an eNodeB (eNB) in a fourth generation mobile communication system (hereinafter referred to as "4G") and an NR base station (gNB) in a fifth generation mobile communication system (hereinafter referred to as "5G"). The core network system 41 and the RAN cooperate with each other to implement a mobile communication network which communicates to and from the terminal 20.

The CU 46 included in the site system 43 executes a site request process by using at least one of the one or more processors 31*a*. In the site request process, the CU 46 requests the AMF 47 corresponding to the network slice to which the terminal 20 requests connection to control communication. The CU 46 included in the base station system 42 executes an external request process by using at least one of the one or more processors 30*a*. Details of those processes are described later.

The core network system 41 is a system corresponding to an evolved packet core (EPC) in 4G or a 5G core (5GC) in 5G. The core network systems 41 in this embodiment are implemented mainly by the plurality of servers 30 arranged in the central data centers 11 or the regional data centers 12. As described above, the core network system 41 includes NEs such as a plurality of AMFs 46, a plurality of SMFs 48, a plurality of UPFs 49, and UDM (not shown) as software functional units. The core network system 41 is connected to an external network such as the Internet.

The AMF 47, the SMF 48, and the UDM included in the core network system 41 form a core controller which controls communication between the terminal 20 and the mobile communication network. The core controller executes a core control process by using at least one of the one or more processors 30*a*. In the core control process, the core controller controls communication by the terminal 20. The core control process includes a path setting process.

The AMF 47 receives a connection request from the terminal 20 via the gNB, and authenticates the terminal 20. When the terminal 20 is authenticated, the AMF 47 registers information for enabling incoming calls to the terminal 20 (information indicating the position of the terminal 20) in an internal database. After the AMF 47 receives the connection request, the SMF 48 sets a communication path between the terminal 20 and an appropriate UPF 49 (establishes a PDU session) in the path setting process. The UDM manages information on subscribers and the terminals 20 (for example, information on the cells in which the terminals 20 are arranged).

For the RUs 44 of the specified base station system 42, when the network slice of the closed network is added to the permitted network slices, the terminals 20 that are connectable to the network slices of the closed network can be connected to the network slice via the specified RUs 44 (and the base station system 42 including those RUs 44). The path setting process is now further described.

In this situation, when connection to the network slice of the closed network is requested, in the path setting process, the SMF 48 sets a communication path between the UPF 49 included in the site system 43 and the terminal 20. Further, when connection to a network slice different from that of the closed network is requested, in the path setting process, the SMF 48 sets a communication path between the UPF 49 included in the core network system 41 and the terminal 20.

A UPF 49 included in the core network system 41 uses at least one of the one or more processors 30*a* to execute a core relay process of relaying communication data between the terminal 20 and an external network such as the Internet. After the core control process receives a request to control communication by the terminal 20 in the network slice of the closed network (strictly speaking, after the communication path between the terminal 20 and the UPF 49 is established), the UPF 49 starts communication to and from the terminal 20 as the core relay process.

The AMF 47, the SMF 48, and the UPF 49 included in the site system 43 each have the same function as in the core network system 41, but are arranged in the site facility 14. Further, those AMF 47, SMF 48, and UPF 49 are capable of performing a process on the network slices of the closed network. Moreover, depending on the usage or the like of the network slice, the AMF 47 included in the site system 43 can process the network slices different from those of the closed network in place of the AMF 47 of the core network system 41.

The AMF 47 and the SMF 48 included in the site system 43 form a site controller which controls communication between the terminal 20 and the closed network of the mobile communication network. The site controller executes a site control process of controlling communication by the terminal 20 by using at least one of the one or more processors 31*a*.

In the site request process, the CU 46 included in the site system 43 selects one of the site control process and the core control process (the AMF 47 of the core network system 41 and the site system 43) and requests communication control. More specifically, in the site request process, when the CU 46 receives a request for connection to the network slice of the closed network from the terminal 20 via the antenna 15 of the site (and the RU 44 connected thereto), the CU 46 requests the site control process to control communication by the terminal 20. Meanwhile, when the CU 46 receives a request for connection to a network slice different from the network slice of the closed network from the terminal 20 via the antenna 15 (and the RU 44 connected thereto), the CU 46 requests the core control process to control communication by the terminal 20 in the network slice different from the network slice of the closed network.

Meanwhile, the CU 46 included in the base station system 42 requests the core control process (strictly speaking, the AMF 47 of the core network system 41) to control communication in the case of a request for connection to the network slice of the closed network as well as in the case of a request for connection to a different network slice. In this case, the CU 46 may change the type of AMF 47 to request control in accordance with the network slice to which the terminal 20 requests connection, or may request control by the same type of AMF 47.

The UPF 49 included in the site system 43 executes a site relay process by using at least one of the one or more processors 31*a*. In the site relay process, the UPF 49 communicates to and from the terminal 20 under the control of the core control process, and relays communication between the terminal 20 and the another system arranged at the site (the another system connected to the closed network). Further, after the core controller receives a communication control request from the CU 46 (strictly speaking, after the communication path between the terminal 20 and the UPF 49 is established), in the site relay process, the UPF 49 uses the antenna 17 (and the RU 44 connected thereto) to start communication to and from the terminal 20.

Further, in the site relay process, the UPF 49 communicates to and from the terminal 20 under the control of the site control process, and relays communication between the terminal 20 and the another system arranged at the site (the another system connected to the closed network). In this case, after the site controller receives a communication control request from the CU 46 (strictly speaking, after the communication path between the terminal 20 and the UPF 49 is established), in the site relay process, the UPF 49 uses the antenna 15 (and the RU 44 connected thereto) to start communication to and from the terminal 20.

The another system includes, for example, at least one of a voice communication system 61, a nurse call system 62, or a database system 63. The site system 43 may be connected to a system different from the systems illustrated in FIG. 2, or may not be connected to a part of the other systems illustrated in FIG. 2. A part of the other systems illustrated in FIG. 2 may not be present.

The voice communication system 61 is a system which implements a call via a telephone line between an external telephone device and a telephone device for an extension call (for example, terminal 20), or a call between telephone devices for the extension call. The voice communication system 61 may include, for example, a session initiation protocol (SIP) server. The functions and processes of the voice communication system 61 and the nurse call system 62 may be implemented by one or more processors 31*a* included in the one or more servers 31 executing programs stored in the storage device 31*b*. Further, the voice communication system 61 and the nurse call system 62 may be implemented by a server different from the server 31 which is connected via the site LAN.

The database system 63 is a computer-implemented system which includes a database. The database system 63 may be, for example, a medical chart management system in a hospital. In FIG. 2, the database system 63 is connected to the UPF 49 via the secure site LAN. The database system 63 may be implemented by one or more servers 31, or may be connected to the UPF 49 without going through a LAN.

When the terminal 20 communicates data to and from another system via the antenna 15 of the site facility 14, the communication is performed via the UPF 49 of the site system 43, and hence the core network system 41 is not used. This is called "local breakout." Local breakout enables efficient communication between the terminal 20 and other systems at the site. Further, when the AMF 47 and the SMF 48 of the core network system 41 are not used, even when a trouble occurs in the core network system 41 or communication between the site system 43 and the core network system 41, the closed network communication at the site can be maintained. As a result, it is possible to prevent the closed network connected to a system at the site from stopping due to a failure.

There is now described a method for implementing the functions of the communication system 1 in this embodiment. The communication system 1 is formed of a plurality of functional units (for example, network functions (NFs)) in order to implement network services. In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or more CNFs. The functional unit in this embodiment may also correspond to a network node.

Figure 3:
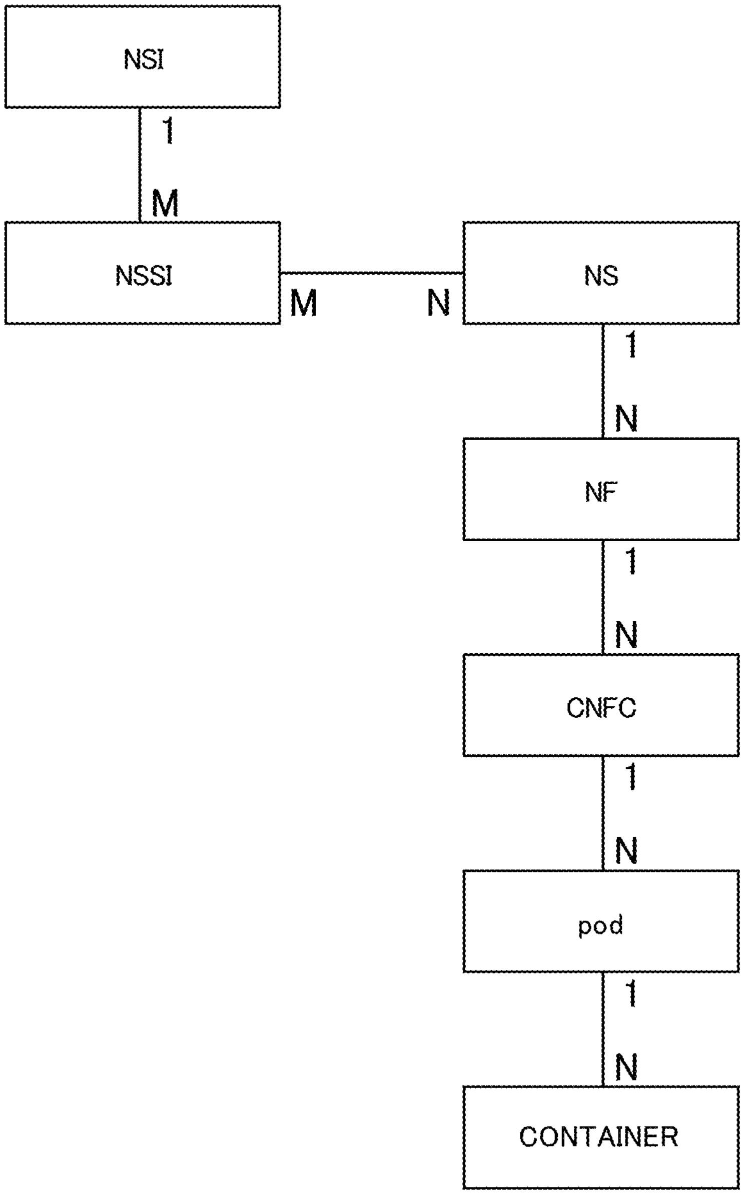
FIG. 3 is a diagram for illustrating an example of links between elements constructed in the communication system in the embodiment.

FIG. 3 is a diagram for schematically illustrating an example of links between elements constructed in the communication system 1 in this embodiment. Symbols M and N indicated in FIG. 3 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 3, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the DU 45, the CU 46, or the UPF 49. The NE also corresponds to an element having a granularity, such as the AMF 47, the SMF, or the UPF 49. In 4G, the NF corresponds to an element having a granularity, such as a mobility management entity (MME), a home subscriber server (HSS), a serving gateway (S-GW), a vDU, or a vCU. In this embodiment, for example, one NS includes one or more NFs. That is, one or more NFs are under the control of one NS.

The CNFC corresponds to an element having a granularity, such as DU mgmt or DU processing. The CNFC may be a microservice deployed on the server 30 as at least one container. For example, some CNFCs may be microservices that provide a part of the functions of the DU 45, the CU 46, and the like. Some CNFCs may be microservices that provide a part of the functions of the UPF 49, the AMF 47, the SMF, and the like. In this embodiment, for example, one NF includes one or more CNFCs. That is, one or more CNFCs are under the control of one NF.

The pod refers to, for example, the minimum unit for managing a Docker container by Kubernetes. In this embodiment, for example, one CNFC includes one or more pods. That is, one or more pods are under the control of one CNFC.

In this embodiment, for example, one pod includes one or more containers. That is, one or more containers are under the control of one pod.

In addition, as illustrated in FIG. 3, a network slice (NSI) and a network slice subnet instance (NSSI) have a hierarchical structure.

The NSIs can be said to be end-to-end virtual circuits that span a plurality of domains (for example, from the RAN to the core network system 41). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or more NSSIs. That is, one or more NSSIs are under the control of one NSI. In this embodiment, a plurality of NSIs may share the same NSSI.

In addition, as illustrated in FIG. 3, the NSSI and the NS generally have a many-to-many relationship.

In addition, in this embodiment, for example, one NF can belong to one or more network slices. Specifically, for example, network slice selection assistance information (NSSAI) including one or more pieces of sub-network slice selection assist information (S-NSSAI) can be set for one NF. In this case, the S-NSSAI is one piece of information for identifying the network slice. At least a part of the NFs are not required to belong to the network slice.

Figure 4:
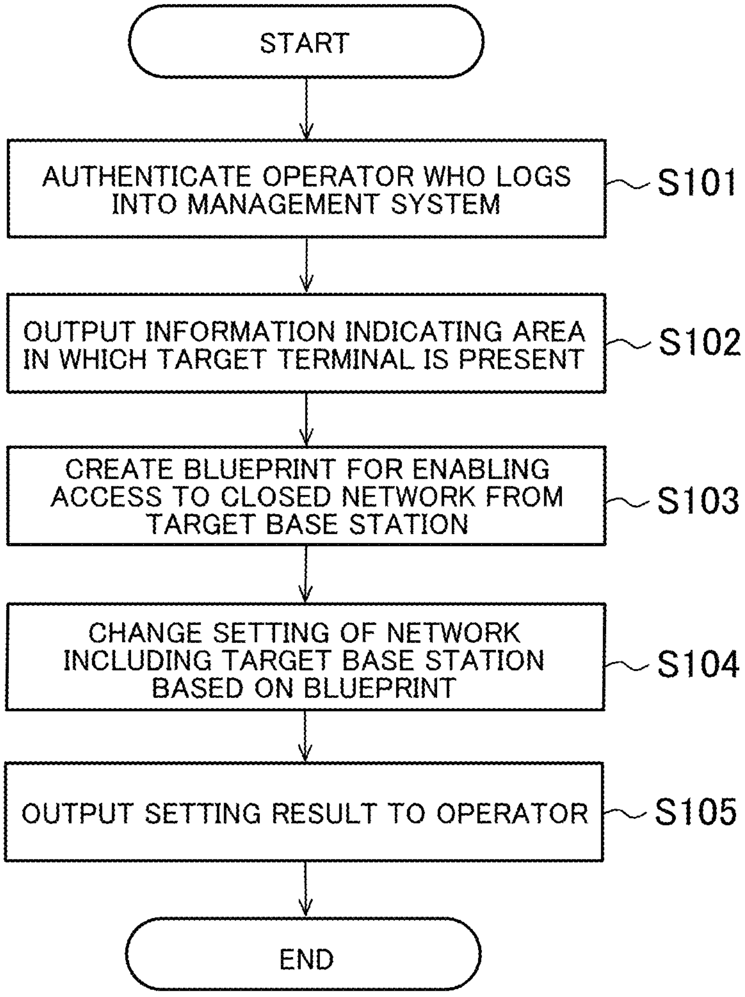
FIG. 4 is a flow chart for illustrating an outline of a process of adding a network slice received by a base station system.

There is now described a method of dynamically enabling the RU 44 of a certain base station system 42 to access the network slice of the closed network. FIG. 4 is a flow chart for illustrating an outline of a process of adding a network slice received by the base station system 42. In FIG. 4, a process executed by the management system 50 is mainly illustrated. In this case, a target of setting relating to the network slice may be a base station system 42 determined in advance. For example, the target of setting may be a base station system 42 including the antenna 17 and the RU 40 installed at a specific facility (for example, hospital) different from the site.

First, in the authentication process, the management system 50 authenticates an operator who logs into the management system 50 (S101). The operator who is permitted to log in is not required to be an administrator of the communication system 1, and may simply be a user of the closed network. Further, the management system 50 may permit login only to authorized users of the closed network.

Then, the computer of the operator transmits, to the management system 50, a procedure start instruction for starting a procedure for enabling access from the target base station to the network slice of the closed network. When the management system 50 receives the procedure start instruction, in the terminal position detection process, the management system 50 outputs information indicating the area in which the target terminal 20 is present (S102). More specifically, the management system 50 acquires identification information (for example, a telephone number) on the terminal 20 of the specific user who uses the closed network from the operator, acquires information indicating which area the terminal 20 having the identification information belongs to from the UDM of the core network system 41, and outputs the acquired information. As used herein, the area may be a cell formed by a base station.

The operator determines, based on the information indicating which area the terminal 20 having the identification information belongs to, whether or not to add the network slice of the closed network to the list of network slices to be received by (the RU 44 of) the predetermined base station system 42. When it is determined to add the network slice of the closed network, the operator transmits a setting generation instruction to the management system 50. The determination may be performed automatically by the management system 50. For example, in the authorization process, the management system 50 may start the process steps after S103 when the terminal 20 having the identification information is present in a cell adjacent to the cell of the predetermined base station system 42.

When the setting generation instruction is received, in the authorization process, the management system 50 creates a blueprint (S103). The blueprint is information for setting the configuration of the communication system 1 by using a container management tool. The blueprint in S103 is information on a setting for enabling access from a certain base station to the closed network. The blueprint includes information for identifying the target base station system 42, information on network slices to which the base station system 42 grants permission, and information indicating the AMFs 47 connectable to the base station system 42. The network slices to which permission is granted include the network slice of the closed network. The information indicating the connectable AMFs 47 may include information indicating an AMF 47 for connecting to the external network and information indicating an AMF 47 for connecting to the closed network.

When the blueprint is created, in the authorization process, the management system 50 may transmit the blueprint to the computer of the operator, and display the blueprint on the computer. The computer of the operator transmits an input instruction for the created blueprint to be input to the communication system 1.

When the input instruction is acquired from the operator, in the authorization process, the management system 50 changes the setting of the network including the target base station system 42 based on the blueprint (S104). In this case, the management system 50 may change the setting of the CU 46 of the base station system 42. Specifically, the management system 50 may change the setting of the CU 46, including a list of network slices connectable by the CU 46 and information indicating the AMF 47 corresponding to the network slice. In the authorization process, when an AMF 47 for connecting to the network slice of the closed network does not exist, the management system 50 may add an AMF 47 for the purpose to the core network system 41.

Figure 6:
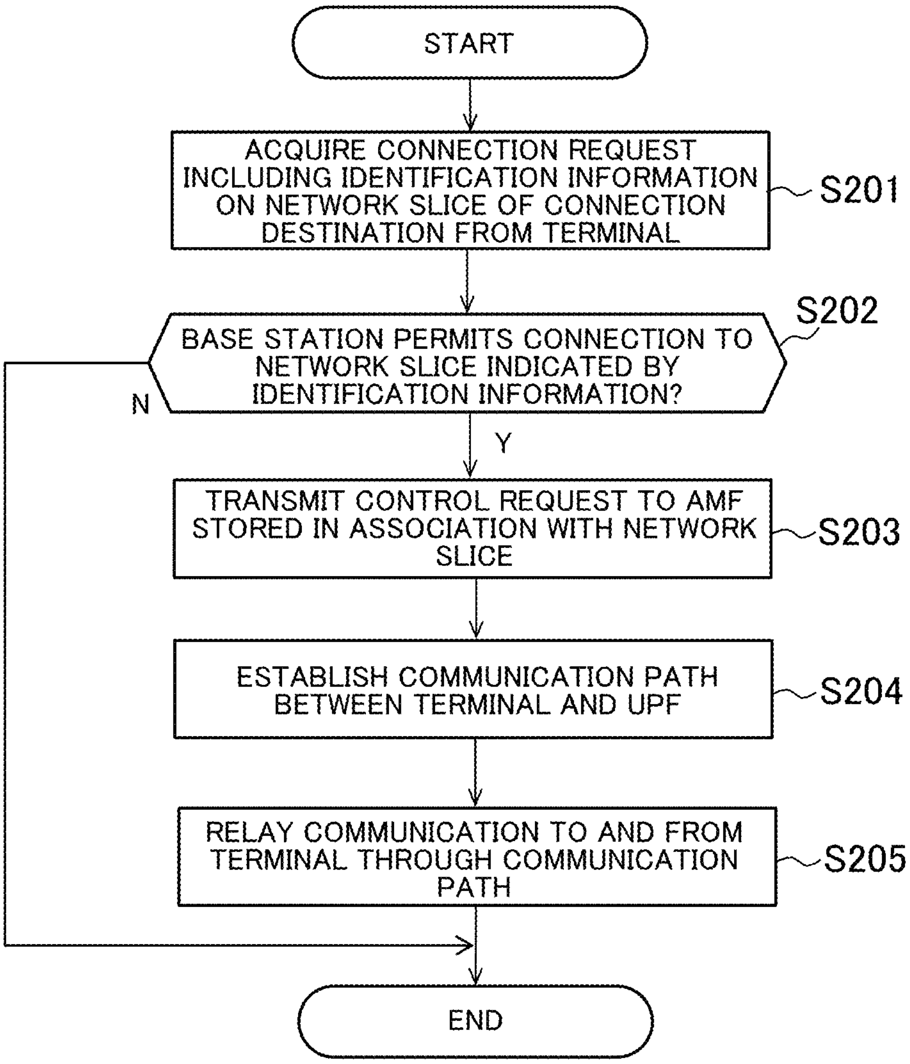
FIG. 6 is a flow chart for illustrating an outline of a process of the communication system performed when a terminal connects to a mobile communication network.

FIG. 6 is a table for showing an example of a list of connectable network slices. In FIG. 6, a list of network slices connectable via the RUs 44 belonging to a certain base station system 42 is shown together with information indicating the AMF 47 corresponding to each network slice. The network slices having identification information listed in the table of FIG. 6 indicate network slices connectable via the RUs 44 belonging to the base station system 42.

"DefaultSlice" of the network slice identification information indicates the network slice for connecting to the external network. The CU 46 requests communication control to the AMF 47 indicated by the AMF identification information "CoreAMF_d" when connection to the network slice is requested. Meanwhile, "ClosedHospitalSlice" of the network slice identification information indicates the network slice for connecting to the closed network of the site. When connection to the network slice is requested, the CU 46 requests communication control to the AMF 47 indicated by the AMF identification information "CoreAMF_h." The AMF 47 is for the network slice of the closed network arranged in the core network system 41. The AMF 47 may also be arranged in the site system 43. The data shown in FIG. 6 is illustrative, and the actual data format may be another data format having the same meaning. The method of matching the network slices and the AMFs 47 is described in "16.3.4.2 AMF and NW Slice Selection" of 3GPP (trademark) TS 38.300 V17.1.0 (2022-06).

When the network setting is changed, the terminal 20 can connect to the network slice of the closed network via the target base station system 42. The management system 50 then outputs the setting result to the operator (S105).

The management system 50 may automatically proceed with the processes without actually performing the setting generation instruction and the input instruction among the procedure start instruction, the setting generation instruction, and the input instruction. Further, the procedure start instruction, the setting generation instruction, and the input instruction are all request information for enabling the base station system 42 to connect to the network slice of the closed network. In particular, the last instruction input by the operator before the process step of S104 can be said to be a permission request that enables the base station system 42 to connect to the network slice of the closed network.

Next, the operation performed when the terminal 20 connects to the mobile communication network is described. FIG. 6 is a flow chart for illustrating an outline of a process of the communication system 1 performed when the terminal 20 connects to the mobile communication network. In FIG. 6, there is illustrated a process performed when the terminal 20 starts communication via the antenna 17 belonging to the base station system 42.

A specific procedure for connecting the terminal 20 to the mobile communication network is publicly known, and thus in FIG. 6, processes which are related to connection to the network slice of the closed network are mainly illustrated.

First, the terminal 20 transmits, to the CU 46 via the RU 44 of the target base station system 42, a connection request including identification information on the network slice for which connection is desired, and in the external request process, the CU 46 acquires the connection request from the terminal 20 (S201). The network slice identification information may be, for example, the S-NSSAI included in the NSSAI from the terminal 20, or may be other information. Of the process steps illustrated in FIG. 6, the process steps to be performed by the CU 46 are included in the external request process.

Next, in the external request process, the CU 46 examines whether or not the base station permits connection to the network slice indicated by the identification information acquired from the terminal 20 (S202). The CU 46 may determine that the connection is permitted when the identification information acquired from the terminal 20 is registered in the list of network slices supported by the base station. When the connection to the network slice indicated by the identification information acquired from the terminal 20 is not permitted, or when the connection request does not include the identification information on the network slice ("N" in S202), the process of FIG. 6 ends, and the terminal 20 is not connected.

Meanwhile, when the connection to the network slice indicated by the identification information acquired from the terminal 20 is permitted ("Y" in S202), in the external request process, the CU 46 acquires the information indicating the AMF 47 stored in association with the network slice. Then, a communication control request is transmitted to the AMF 47 indicated by the information (S203). The AMF 47 associated with the network slice may belong to any one of the core controller or the site controller.

When the AMF 47 receives the control request, the AMF 47 executes processes such as authentication of the terminal 20. Further, the SMF 48 working together with the AMF 47 establishes a communication path (PDU session) between the terminal 20 and the UPF 49 (S204). The SMF 48 is included in the same core controller when the AMF 47 which has received the control request is included in the core controller, and is included in the site controller when the AMF 47 is included in the site controller. When the network slice to be connected is the network slice of the closed network, the UPF 49 is arranged in the site system 43. Meanwhile, when the network slice to be connected to is for communicating to and from an external network, the UPF 49 is arranged in the core network system 41.

Then, the UPF 49 relays communication between the terminal 20 and the external network or the another system through the communication path (S205).

A process similar to that illustrated in FIG. 6 is performed also when the terminal 20 starts communication via the antenna 15 (and the RU 44 connected thereto) belonging to the site system 43. In this case, instead of the CU 46 belonging to the base station system 42 and executing the external request process, the CU 46 belonging to the site system 43 and executing the site request process executes the process.

Next, the relationship between updating the list of connectable network slices and communication is described with reference to the drawings.

Figure 7:
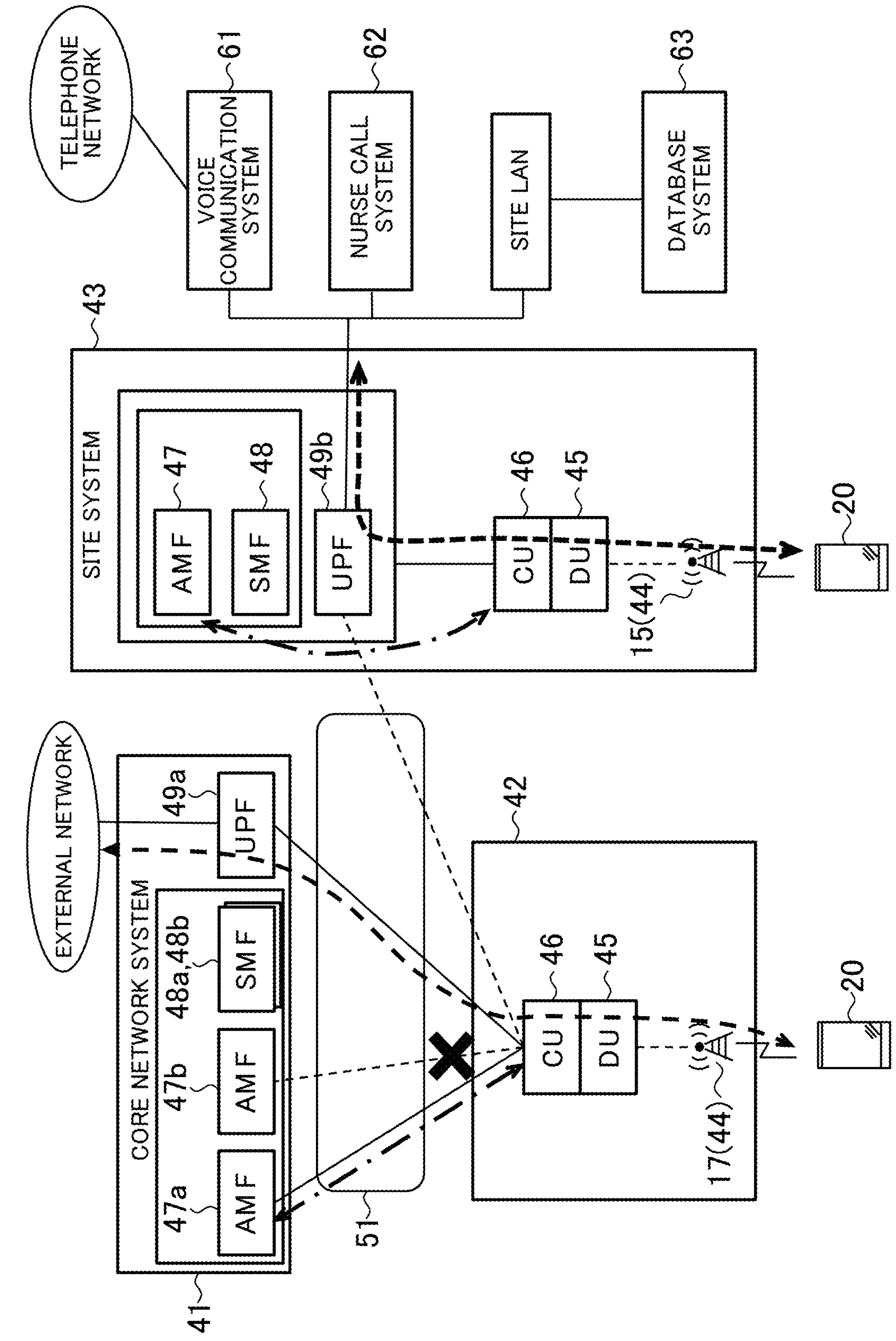
FIG. 7 is a diagram for illustrating an example of communication by a terminal before a network slice is added.

FIG. 7 is a diagram for illustrating an example of communication by a terminal 20 before the network slice of the closed network is added to the list of connectable network slices. In FIG. 7, the communication performed before the process steps of FIG. 4 is schematically illustrated.

It is assumed that the core network system 41 includes AMFs 47*a* and 47*b*, SMFs 48*a* and 48*b*, and a UPF 49*a*, and the site system 43 includes an AMF 47, an SMF 48, and a UPF 49*b*. It is also assumed that the AMF 47*a*, the SMF 48*b*, and the UPF 49*a* are NEs of network slices (default network slices) which connect to external networks. It is also assumed that the AMF 47*b*, the SME 48*b*, the AMF 47, the SMF 48, and the UPF 49*b* of the site system 43 are NEs of the network slice of the closed network.

Further, in the example of FIG. 7, it is assumed that a default network slice is registered in the list of network slices to which the CU 46 of the base station system 42 can connect, and a network slice of a closed network is not registered.

When the terminal 20 connects to the default network slice via the antenna 17 and the RU 44 of the base station system 42, the CU 46 of the base station system 42 transmits a communication control request to the AMF 47*a* (see the dash-dotted arrows). Then, a communication path between the terminal 20 and the UPF 49*a* is established under the control of the SMF 48*a*. The UPF 49*a* relays communication (see the dashed arrows) between the terminal 20 and the external network.

When the terminal 20 connects to the network slice of the closed network via the antenna 15 and the RU 44 of the site system 43, the CU 46 of the site system 43 transmits a communication control request to the AMF 47 (see the dash-dotted arrows). Then, a communication path between the terminal 20 and the UPF 49*b* is established under the control of the SMF 48 of the site system 43. The UPF 49*b* relays communication (see the dashed arrows) between the terminal 20 and another system.

Although not shown in FIG. 7, when the terminal 20 connects to the default network slice via the antenna 15 and the RU 44 of the site system 43, the CU 46 of the site system 43 may transmit a communication control request to the AMF 47*a*. In this case, a communication path between the terminal 20 and the UPF 49*a* is established under the control of the SMF 48*a*, and the UPF 49*a* may relay communication between the terminal 20 and the external network.

Meanwhile, in the example of FIG. 7, even when the terminal 20 tries to connect to the network slice of the closed network via the antenna 17 and the RU 44 of the base station system 42, the CU 46 does not authorize the connection, and does not transmit a communication control request to the AMF 47*b* (see the "x" mark in FIG. 7). Thus, there is no relay of communication by the UPF 49*b* to the terminal 20.

Figure 8:
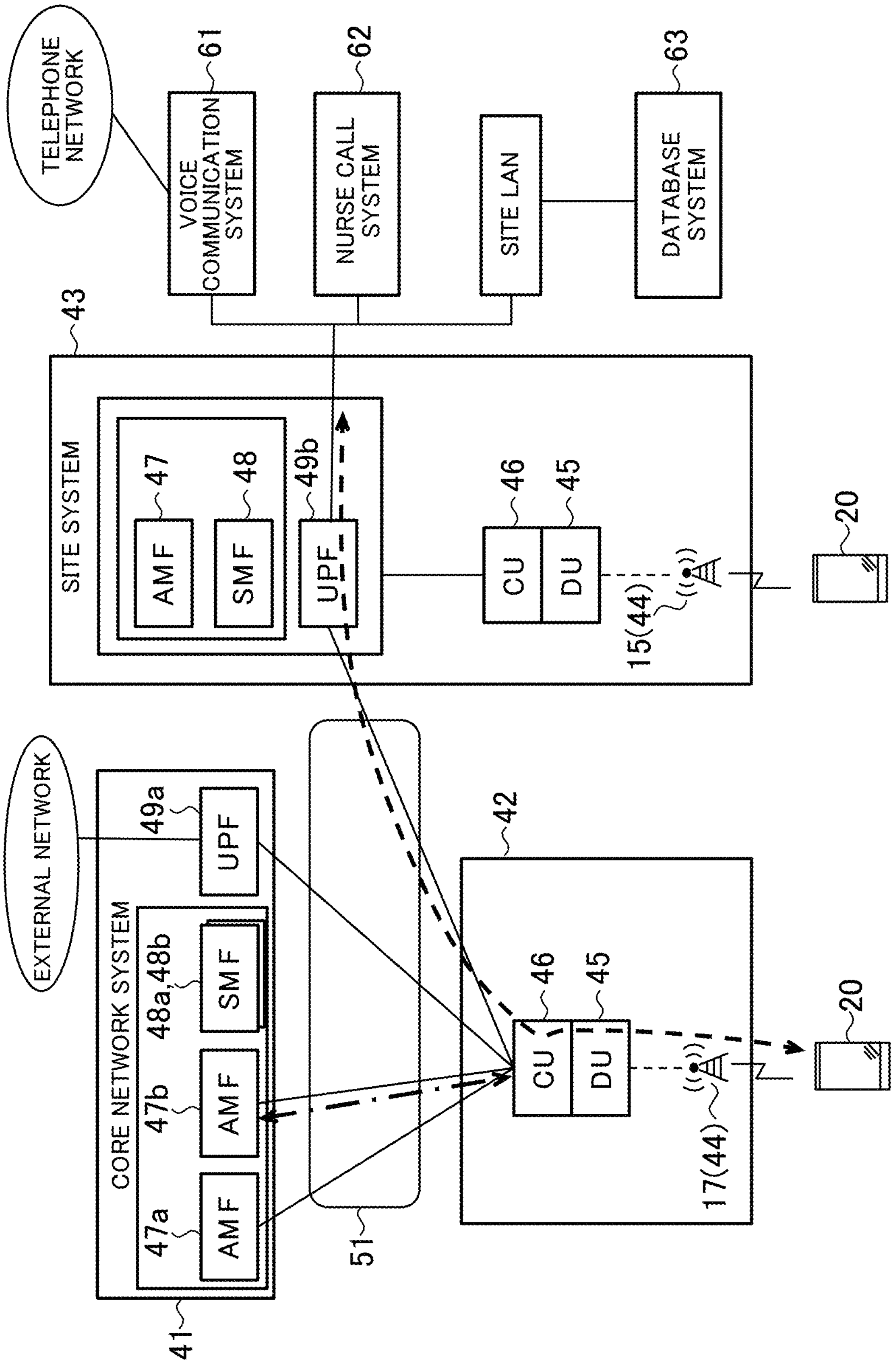
FIG. 8 is a diagram for illustrating an example of communication by a terminal after a network slice is added.

FIG. 8 is a diagram for illustrating an example of communication of the terminal 20 after the network slice of the closed network is added to the list of connectable network slices. In FIG. 8, there is illustrated an example of the communication performed after the process steps of FIG. 4 are executed.

When the terminal 20 connects to the network slice of the closed network via the antenna 17 and the RU 44 of the base station system 42, the CU 46 of the base station system 42 transmits a communication control request to the AMF 47*b* (see the dash-dotted arrows). Then, a communication path between the terminal 20 and the UPF 49*b* is established under the control of the SMF 48*b*. The UPF 49*b* relays communication (see the dashed arrows) between the terminal 20 and the external network.

In this state, when the terminal 20 connects to the default network slice via the antenna 17 and the RU 44 of the base station system 42, a communication path between the terminal 20 and the UPF 49*a* is established in the same manner as in FIG. 7.

Further, as illustrated in FIG. 7 and FIG. 8, the AMF 47 controlling communication may differ depending on whether communication is via the antenna 15 in the site system 43 or via another antenna 17. In particular, as described in this embodiment, when the voice communication system 61 or the like outside the mobile communication network provides a call via a telephone network, there is less of a requirement for location information on the terminal 20 managed by the AMF 47, and thus an embodiment like this embodiment becomes possible.

Figure 9:
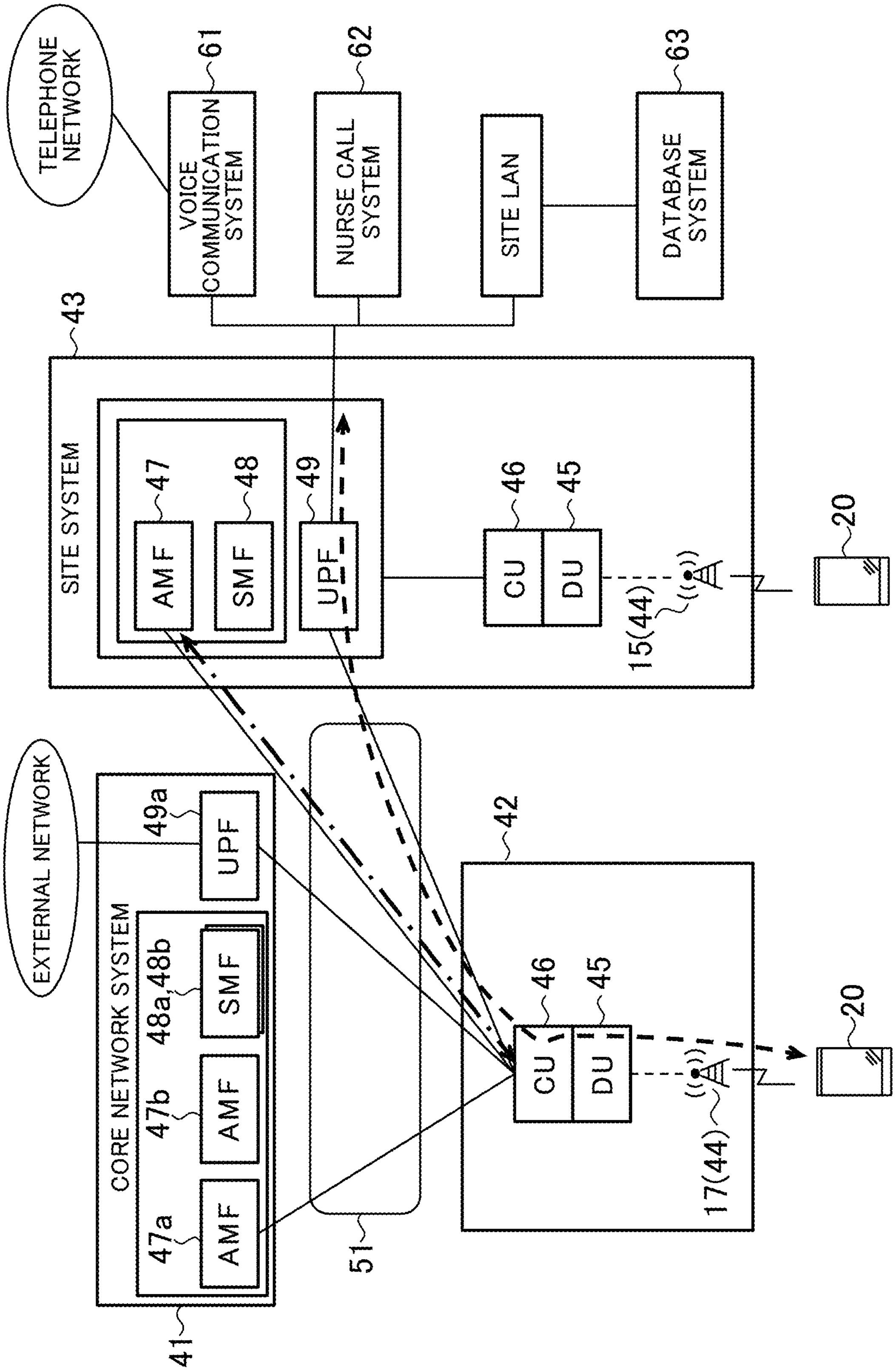
FIG. 9 is a diagram for illustrating a modification example of communication by a terminal after a network slice is added.

When the network slice of the closed network is added to the list of connectable network slices, the AMF 47 of the site system 43 may be set in the CU 46 in association with the network slice of the closed network. FIG. 9 is a diagram for illustrating a modification example of communication by the terminal 20 after the network slice of the closed network is added to the list of connectable network slices.

In the example of FIG. 9, when the terminal 20 connects to the network slice of the closed network via the antenna 17 and the RU 44 of the base station system 42, the CU 46 of the base station system 42 transmits a communication control request to the AMF 47 of the site system 43 (see the dash-dotted arrows). Then, a communication path between the terminal 20 and the UPF 49*b* is established under the control of the SMF 48 of the site system 43.

In this way, by changing the setting of the CU 46 of the base station system 42, it is possible to dynamically change whether or not to connect to the closed network. Moreover, the CU 46 may transmit a communication connection request to an AMF 47 of the same type in the core network system 41 regardless of whether or not the network slice of the closed network is accessed. In this case, the core controller including the AMF 47 and the SMF 48 may set an appropriate communication path to and from the UPF 49 in accordance with the network slice to be connected to.

Figure 10:
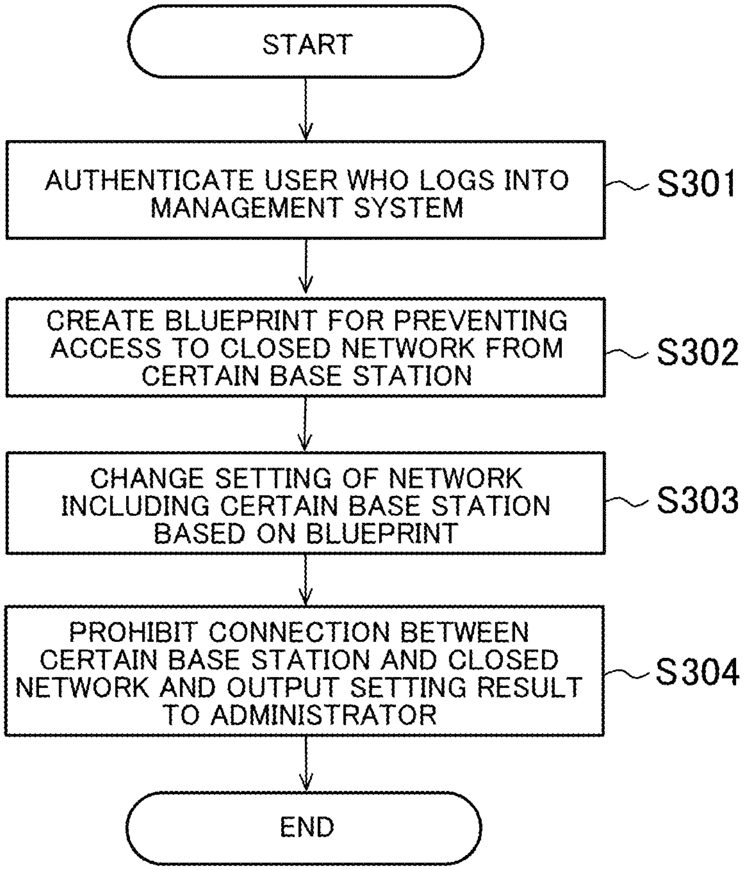
FIG. 10 is a flow chart for illustrating an outline of a process of deleting a network slice received by a base station system.

When the communication by the terminal 20 in the network slice of the closed network ends, the base station system 42 performs a process of deleting the network slice of the closed network from the list of connectable network slices. FIG. 10 is a flow chart for illustrating an outline of a process of deleting a network slice received by the base station system 42.

First, in the authentication process, the management system 50 authenticates an operator who logs into the management system 50 (S301).

Then, the computer of the operator transmits to the management system 50 a deletion start instruction to start a procedure for deleting the setting of the network slice of the closed network from the target base station. When the management system 50 receives the deletion start instruction, in a cancellation process, the management system 50 creates a blueprint (S302). The blueprint in S302 is information on a setting for preventing access to the closed network from the target base station. The blueprint includes information for identifying the target base station system 42, information on network slices to which the base station system 42 grants permission, and information indicating the AMFs 47 connectable to the base station system 42. The network slices to which permission is granted do not include the network slice of the closed network. The information indicating the connectable AMFs 47 may include information indicating an AMF 47 for connecting to the external network.

When the blueprint is created, in the cancellation process, the management system 50 may transmit the blueprint to the computer of the operator, and display the blueprint on the computer. The computer of the operator transmits an input instruction for the created blueprint to be input to the communication system 1.

When the input instruction is acquired from the operator, in the cancellation process, the management system 50 changes the setting of the network including the target base station system 42 based on the blueprint (S303). In this case, the management system 50 may change the setting of the CU 46 of the base station system 42. More specifically, the management system 50 may change the setting of the CU 46, including a list of network slices connectable by the CU 46 and information indicating the AMF 47 corresponding to the network slice.

When the network setting is changed, the terminal 20 can no longer connect to the network slice of the closed network via the target base station system 42. The management system 50 then outputs the setting result to the operator (S304).

The input instruction may be processed automatically by the management system 50 without actually being performed. Further, the deletion start instruction and the input instruction are both information on a request for preventing connection to the network slice of the closed network via the base station system 42. In particular, the last instruction input by the operator before the process step of S303 can be said to be a prevention request to prevent connection to the network slice of the closed network via the base station system 42. Further, the management system 50 may automatically execute the cancellation process of S302 and S303 when the communication using the network slice of the closed network via the base station system 42 is not detected for a certain period of time.

In this embodiment, secure communication can be achieved even without performing a VPN operation, for example, at the terminal 20 by using a predetermined network slice forming a closed network and a specific base station as a communication path between the terminal 20 and another system providing a service at a site. Further, by dynamically changing the network slices that can be received by base stations, non-required access can be suppressed and security can be improved. For example, it is possible to enable access when a doctor or a nurse dispatched to a facility different from a site performs a consultation, and disable access after the consultation. In addition, by suppressing non-required accesses, it is also possible to effectively use communication resources.

It should be noted that the present disclosure is not limited to the above-mentioned embodiment. The configurations disclosed in the embodiment may be combined in various ways. Further, within the scope of the technical idea of the present disclosure, a part of the configurations described in this embodiment may be modified.

In this embodiment, the base station system 42 including the base station facility 16 on the ground is assumed to be the base station, but instead of the antenna 17 of the base station, a satellite capable of communicating on the same frequency band as that of the base station on the ground may be used.

In this case, any one of the base station systems 42 may include a satellite earth station which communicates to and from satellites relaying the signals of the terminal 20, and the DU 45 and CU 46 which process the communication via the satellite earth station. The satellite earth station is a type of radio communication device. Based on a method similar to that described above, the network slices connectable via the satellites and satellite earth station may be dynamically changed. Through dynamically setting whether or not to connect to the network slice of the closed network via the satellites, it becomes possible to build a closed network over a wide area such as the whole of Japan when necessary. In the case of a hospital closed network, the wide-area closed network can be utilized, for example, when doctors are dispatched in the event of a disaster.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

As can be understood from the above description of the embodiment, in the present application, a variety of technical ideas including the disclosure described below are disclosed.

(1) There is provided a communication system including: one or more processors; and a plurality of base station radio devices including a specified radio device, the communication system causing at least one of the one or more processors to execute: an authorization process of authorizing, based on a permission request relating to a terminal connectable to a predetermined network slice forming a closed network, the predetermined network slice as a network slice to which connection via the specified radio device is permitted; a path setting process of setting, after the predetermined network slice is authorized, a communication path between the terminal connecting to the predetermined network slice via the specified radio device and a service system connected to the predetermined network slice; and a cancellation process of canceling, after communication between the terminal and the service system via the specified radio device is finished, the authorization of the predetermined network slice as the network slice to which connection via the specified radio device is permitted.

(2) In the communication system of Item (1), the authorization process is based on a permission request by a user of the service system relating to a terminal connectable to the predetermined network slice.

(3) In the communication system of Item (1) or (2), a part of the one or more processors is arranged at a site at which the service system is arranged, and the communication system causes at least one of the part of the one or more processors arranged at the site to execute a relay process of relaying communication between the terminal connected to the predetermined network slice via the specified radio device and the service system.

(4) In the communication system of Item (3), the communication system further includes a site radio device arranged at the site and connectable to the predetermined network slice, and, in the relay process, communication between another terminal connected to the predetermined network slice via the site radio device and the service system is further relayed.

(5) In the communication system of Item (3) or (4), in the path setting process, a communication path between an external network different from the closed network and the terminal is set when the terminal connects to a network slice different from the predetermined network slice via the specified radio device.

(6) There is provided a communication control method including causing at least one of one or more processors to: authorize, based on a permission request relating to a terminal connectable to a predetermined network slice forming a closed network, the predetermined network slice as a network slice to which connection via a specified radio device which is a part of a plurality of base station radio devices is permitted; set, after the predetermined network slice is authorized, a communication path between the terminal connecting to the predetermined network slice via the specified radio device and a service system connected to the predetermined network slice; and cancel, after communication between the terminal and the service system via the specified radio device is finished, the authorization of the predetermined network slice as a network slice to which connection via the specified radio device is permitted.

The invention claimed is:

1. A communication system, comprising:
- one or more processors; and
- a first communication network including a plurality of base stations,
- a closed second communication network formed by a predetermined network slice, wherein access to the closed second communication network from the first communication network via the plurality of base stations is prohibited,
- the communication system causing at least one of the one or more processors to execute:
  - registering the closed second communication network with at least one of the plurality of base stations and lifting a prohibition of access to the closed second communication network from the at least one of the plurality of base stations;
  - establishing a first communication path between the at least one of the plurality of base stations and the closed second communication network;
  - receiving an access request for the closed second communication network via the first communication path;
  - confirming whether a first communication terminal that transmitted the access request has access permission for the predetermined network slice;
  - in response to the first communication terminal having access permission for the predetermined network slice, authorizing access of the first communication terminal to the predetermined network slice of the closed second communication network;
  - after the access of the first communication terminal is authorized, setting a second communication path between the first communication terminal and a service system connected to the predetermined network slice; and
  - after communication between the first communication terminal and the service system is finished, automatically deleting the second communication path to prevent re-access of the first communication terminal to the service system.

2. The communication system according to claim 1,
- wherein a part of the one or more processors is arranged at a site at which the service system is arranged, and
- wherein the communication system causes at least one of the part of the one or more processors arranged at the site to relay communication between the first communication terminal and the service system.

3. The communication system according to claim 2, further comprising a site radio device arranged at the site and connectable to the predetermined network slice,
- wherein, even if access to the second communication network from the first communication network is prohibited, in response to receiving an access from the first communication terminal via the site radio device, communication between the first communication terminal and the service system is relayed by the site radio device.

4. The communication system according to claim 2, wherein, even if access to the closed second communication network from the first communication network is prohibited, in response to receiving an access request to a third network, that is different from the second network, from the first communication terminal via the at least one of the plurality of base stations in the first communication network, a communication path between the third network and the first communication terminal is set.

5. The communication system according to claim 1, wherein:
- each of the plurality of base stations includes a Radio Unit (RU); and
- registering the closed second communication network with the at least one of the plurality of base stations includes registering the closed second communication network with the at least one of the plurality of base stations based on a relationship between a cell provided by the RU and a cell to which the first communication terminal is connected.

6. The communication system according to claim 1, wherein:
- each of the plurality of base stations includes a Radio Unit (RU); and
- registering the closed second communication network with the at least one of the plurality of base stations is performed based on a relationship that is configured to indicate that a distance between a cell provided by the RU and a cell to which the first communication terminal is connected is within a predetermined range.

7. The communication system according to claim 1, wherein:

each of the plurality of base stations includes a Radio Unit (RU); and registering the closed second communication network with the at least one of the plurality of base stations is performed based on a relationship that is configured to indicate that a cell provided by the RU and a cell to which the first communication terminal is connected are the same cell or are adjacent to each other.

8. The communication system according to claim 1, wherein the service system is a containerized system that is a part of the closed second communication network and containerized from a rest of the closed second communication network, and is configured to implement a network service.

9. The communication system according to claim 1, wherein automatically deleting the second communication path to prevent re-access of the first communication terminal to the service system comprises deleting the second communication path without instruction from the first communication terminal.

10. A communication control method, comprising causing at least one of one or more processors to:

register the closed second communication network with at least one of a plurality of base stations and lifting a prohibition of access to a closed second communication network from the at least one of the plurality of base stations, the plurality of base stations included in a first communication network, and the closed second communication network formed by a predetermined network slice, wherein access to the closed second communication network from the first communication network via the plurality of base stations is prohibited;

establish a first communication path between the at least one of the plurality of base stations and the closed second communication network;

receive an access request for the closed second communication network via the first communication path;

confirm whether a first communication terminal that transmitted the access request has access permission for the predetermined network slice;

in response to the first communication terminal having access permission for the predetermined network slice, authorize access of the first communication terminal to the predetermined network slice of the closed second communication network;

set, after the access of the first communication terminal is authorized, a second communication path between the first communication terminal and a service system connected to the predetermined network slice; and automatically delete, after communication between the first communication terminal and the service system is finished, the second communication path to prevent re-access of the first communication terminal to the service system.

11. The communication control method according to claim 10, wherein:

each of the plurality of base stations includes a Radio Unit (RU); and registering the closed second communication network with the at least one of the plurality of base stations is performed based on a relationship between a cell provided by the RU and a cell to which the first communication terminal is connected.

12. The communication control method according to claim 10, wherein:

each of the plurality of base stations includes a Radio Unit (RU); and registering the closed second communication network with the at least one of the plurality of base stations is performed based on a relationship that is configured to indicate that a distance between a cell provided by the RU and a cell to which the first communication terminal is connected is within a predetermined range.

13. The communication control method according to claim 10, wherein:

each of the plurality of base stations includes a Radio Unit (RU); and registering the closed second communication network with the at least one of the plurality of base stations is performed based on a relationship that is configured to indicate that a cell provided by the RU and a cell to which the first communication terminal is connected are the same cell or are adjacent to each other.

14. The communication control method according to claim 10, wherein the service system is a containerized system that is a part of the closed second communication network and containerized from a rest of the closed second communication network, and is configured to implement a network service.

15. The communication control method according to claim 10, wherein automatically deleting, after communication between the first communication terminal and the service system is finished, the second communication path to prevent re-access of the first communication terminal to the service system comprises deleting the second communication path without instruction from the first communication terminal.

* * * * *